UNITED STATES PATENT OFFICE.

LLEWELLYN JONES, OF MUNCIE, INDIANA, AND CHARLES WESTLAKE, JR., OF YOUNGSTOWN, OHIO.

MATERIAL FOR AND PROCESS OF FORMING BRICK, TILE, AND THE LIKE.

1,390,038.　　　　Specification of Letters Patent.　　Patented Sept. 6, 1921.

No Drawing.　　Application filed September 4, 1919.　Serial No. 321,551.

*To all whom it may concern:*

Be it known that we, LLEWELLYN JONES and CHARLES WESTLAKE, Jr., citizens of the United States, and residents, respectively, of Muncie, in the county of Delaware and State of Indiana, and Youngstown, in the county of Mahoning and State of Ohio, have invented a new and useful Improvement in Material for and Processes of Forming Brick, Tile, and the like, of which the following is a specification.

The present invention relates to a process of, and material for, the manufacture of brick, tile and the like, my object being the provision of a material of a nature capable of thorough cementation, as well as a process wherein this material may be thoroughly cemented without the necessity of burning in a kiln, as is necessary with clay.

A further object is therefore the provision of a material and process by means of which brick and tile may be formed in a variety of shapes, impractical in a burnt brick on account of warping, breaking and cracking during the burning process.

A further object consists in a process whereby material in the nature of a bi-product of blast furnace slag may be utilized in the formation of lasting and efficient brick or tile.

In the material proposed by my present invention, silica, lime, magnesia and sulfur are present in about the following proportions; silica 65 to 75%, lime 20 to 30%, magnesia $1\frac{1}{2}$ to $3\frac{1}{2}$% and sulfur $1\frac{1}{2}$ to $3\frac{1}{2}$%, although, if these materials are mixed for the purpose of forming brick or tile it is preferred that the following exact percentages be employed: silica 70%, lime 25%, magnesia $2\frac{1}{2}$% and sulfur $2\frac{1}{2}$%.

It is proposed, however, that the material shall be obtained from blast furnace slag of which the desired materials constitute about 70% of the original mass, the remaining 30% containing materials incapable of use for the present purpose, including iron and dirt for the most part which are thrown out by any suitable means, as for instance by a rotary screening method. This leaves the materials desired for use in the present process of varying proportions between the percentages as above stated, the materials thus derived as a bi-product of blast furnace slag being in a dry state the same as if the silica, lime, magnesia and sulfur were mixed as such for the formation of the material in the first instance.

In further carrying out the process, the material either mixed or derived as a bi-product of blast furnace slag in the above manner, is placed into shapes or forms and is solidified by the application of a high pressure in such shapes or forms within an hydraulic press, the pressure utilized being preferably from 8,000 to 10,000 pounds per square inch, so that under this intense pressure, the material will cement and become solid. This process completes in a quick, efficient manner what it would otherwise, and without pressure, require considerable time, for instance a number of years for the material to accomplish naturally.

By the use of my improved process, bricks, tile and the like may be formed in a great number of different shapes and sizes of which they are incapable in the ordinary process of burning clay materials on account of warping, breaking and cracking during the burning thereof, and permits of the accurate shaping of interlocking bricks and tile capable of use with liquid cement so as to eliminate the necessity for the trowel and mortar, as well as skilled mechanics in setting the brick or tile.

We claim:—

1. A material for dry pressing in the formation of brick, tile and the like, containing silica from 65 to 75%, lime from 20 to 30%, magnesia from $1\frac{1}{2}$ to $3\frac{1}{2}$% and sulfur from $1\frac{1}{2}$ to $3\frac{1}{2}$%.

2. A material for dry pressing in the formation of brick, tile and the like, containing silica 70%, lime 25%, magnesia $2\frac{1}{2}$% and sulfur $2\frac{1}{2}$%.

3. The process of forming brick and tile from blast furnace slag which consists in removing from the slag a portion of the materials contained therein, including iron and dirt, so as to leave a bi-product containing silica, lime, magnesia and sulfur and in then pressing this bi-product materials under a high pressure in shapes or forms as described.

4. The process of forming brick, and tile which consists in extracting a material containing silica, lime, magnesia and sulfur as a bi-product from blast furnace slag and then solidifying the same under a high pressure in molds as described.

5. The herein described process of forming bricks, tile and the like which consists in solidifying a dry material consisting of silica, lime, magnesia and sulfur within molds and under intense pressure to cause cementation thereof.

LLEWELLYN JONES.
CHAS. WESTLAKE, Jr.